United States Patent
Nagao et al.

(10) Patent No.: US 7,861,816 B2
(45) Date of Patent: Jan. 4, 2011

(54) MOTORCYCLE CONFIGURED TO FACILITATE ACCESS TO ENGINE CYLINDER

(75) Inventors: Daisuke Nagao, Long Beach, CA (US); Kenji Tamura, Redondo Beach, CA (US)

(73) Assignee: Honda Motor Company, Ltd., Tokyo (JP)

( * ) Notice: Subject to any disclaimer, the term of this patent is extended or adjusted under 35 U.S.C. 154(b) by 165 days.

(21) Appl. No.: 12/255,278

(22) Filed: Oct. 21, 2008

(65) Prior Publication Data

US 2010/0096206 A1 Apr. 22, 2010

(51) Int. Cl.
*B62D 61/02* (2006.01)
*B62K 11/08* (2006.01)

(52) U.S. Cl. .................. 180/219; 180/225

(58) Field of Classification Search ............... 180/219, 180/225
See application file for complete search history.

(56) References Cited

U.S. PATENT DOCUMENTS

| | | | |
|---|---|---|---|
| 4,226,296 A | 10/1980 | Higaki | |
| 4,696,363 A | 9/1987 | Enda | |
| 4,800,979 A | 1/1989 | Tatsuji | |
| 4,805,716 A | 2/1989 | Tsunoda et al. | |
| 4,887,687 A | 12/1989 | Asai et al. | |
| 5,375,677 A | 12/1994 | Yamagiwa et al. | |
| 5,996,717 A | 12/1999 | Hisadomi | |
| 6,024,185 A | 2/2000 | Okada et al. | |
| 6,234,263 B1 | 5/2001 | Boivin et al. | |
| D455,678 S | 4/2002 | Schroeder et al. | |
| 6,450,282 B1 | 9/2002 | Gogo et al. | |
| 6,691,814 B2 | 2/2004 | Toyoda | |
| 6,866,112 B2 | 3/2005 | Hoechst et al. | |
| 2005/0103548 A1* | 5/2005 | Kudo | 180/219 |
| 2005/0150703 A1 | 7/2005 | Nakagome et al. | |
| 2005/0161271 A1* | 7/2005 | Kimori et al. | 180/219 |
| 2005/0236203 A1* | 10/2005 | Toftner | 180/219 |
| 2006/0060404 A1* | 3/2006 | Buell et al. | 180/219 |
| 2006/0169512 A1* | 8/2006 | Tomii et al. | 180/219 |
| 2006/0197304 A1 | 9/2006 | Ishikawa et al. | |
| 2007/0023218 A1* | 2/2007 | Koike et al. | 180/219 |
| 2007/0089921 A1* | 4/2007 | Miyabe | 180/219 |
| 2007/0175689 A1* | 8/2007 | Plourde | 180/219 |
| 2008/0000707 A1* | 1/2008 | Gruber et al. | 180/219 |

(Continued)

OTHER PUBLICATIONS

Article entitled "Suspension". Riders Club, February No. 370 Special 2, p. 60. Known to be in the public domain prior to Oct. 21, 2007. Published by Ei Shuppansha, Tokyo, Japan. See photographs on attached color copy.

*Primary Examiner*—Lesley Morris
*Assistant Examiner*—Marlon A Arce
(74) *Attorney, Agent, or Firm*—Ulmer & Berne LLP

(57) ABSTRACT

A motorcycle includes a main frame having left and right main frame members which each extend obliquely downwardly and rearwardly from a forward end to a rearward end. The forward end of the main frame includes a steering interface and the rearward end of the main frame includes a swingarm interface. An engine is attached to the main frame. A swingarm is attached to the swingarm interface and supports a rear wheel. A seat is attached to the main frame at an attachment location. The main frame, the swingarm, and the seat together at least partially define an open space of sufficient size to facilitate substantially complete access to the second cylinder head when the motorcycle is fully assembled.

23 Claims, 2 Drawing Sheets

U.S. PATENT DOCUMENTS

2008/0006463 A1* 1/2008 Oohashi .................... 180/219
2008/0236524 A1* 10/2008 Maehara et al. .......... 123/90.12
2009/0255365 A1* 10/2009 Bunne ...................... 74/551.2
2010/0095803 A1* 4/2010 Nagao et al. ............... 74/551.9
2010/0096205 A1* 4/2010 Nagao et al. ............... 180/219

* cited by examiner

MOTORCYCLE CONFIGURED TO FACILITATE ACCESS TO ENGINE CYLINDER

TECHNICAL FIELD

A motorcycle has components which define an open space adjacent to a cylinder head of the motorcycle's engine.

BACKGROUND

Many conventional motorcycles include a frame, a front wheel, a rear wheel, a seat, suspension elements, and a multicylinder engine. The engine is attached to the frame such that access to a rearward cylinder of the engine is blocked from access by other components of the motorcycle such as the frame; the rear wheel, the seat, and/or one or more suspension elements. Accordingly, it can be difficult to remove, replace, clean and/or otherwise service components of the rearward engine cylinder. Additionally, this conventional configuration can provide a motorcycle with a bulky and heavy appearance.

SUMMARY

In accordance with one embodiment, a motorcycle comprises a main frame extending from a forward end to a rearward end. The main frame comprises a left main frame member and a right main frame member. The left main frame member and the right main frame member each extend obliquely downwardly and rearwardly from the forward end to the rearward end. The forward end of the main frame comprises a steering interface and the rearward end of the main frame comprises a swingarm interface. An engine is attached to the main frame at a location at least partially between the left main frame member and the right main frame member. The engine comprises a first cylinder head and a second cylinder head. The first cylinder head is more closely adjacent than the second cylinder head to the steering interface. The second cylinder head is more closely adjacent than the first cylinder head to the swingarm interface. A swingarm is attached to the swingarm interface and supports a rear wheel. A seat is configured to support an operator. The seat is attached to the main frame at an attachment location. The main frame, the swingarm, and the seat together at least partially define an open space of sufficient size to facilitate substantially complete access to the second cylinder head when the motorcycle is fully assembled.

In accordance with another embodiment, a motorcycle comprises a main frame extending from a forward end to a rearward end. The main frame comprises a left main frame member and a right main frame member. The left main frame member and the right main frame member each extend obliquely downwardly and rearwardly from the forward end to the rearward end. The forward end of the main frame comprises a steering interface and the rearward end of the main frame comprises a swingarm interface. A V-twin engine is attached to the main frame at a location at least partially between the left main frame member and the right main frame member. The engine comprises a first cylinder head and a second cylinder head. The first cylinder head is more closely adjacent than the second cylinder head to the steering interface. The second cylinder head is more closely adjacent than the first cylinder head to the swingarm interface. A swingarm is attached to the swingarm interface and supports a rear wheel. A seat is configured to support an operator. The seat is attached to the left main frame member at a left attachment location. The seat is attached to the right main frame member at a right attachment location. The seat extends obliquely upwardly and rearwardly from the left attachment location and the right attachment location. The left attachment location and the right attachment location are disposed along the main frame about halfway between the forward end of the main frame and the rearward end of the main frame. The main frame, the swingarm, and the seat together at least partially define a first open space of sufficient size to facilitate substantially complete access to the second cylinder head when the motorcycle is fully assembled.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
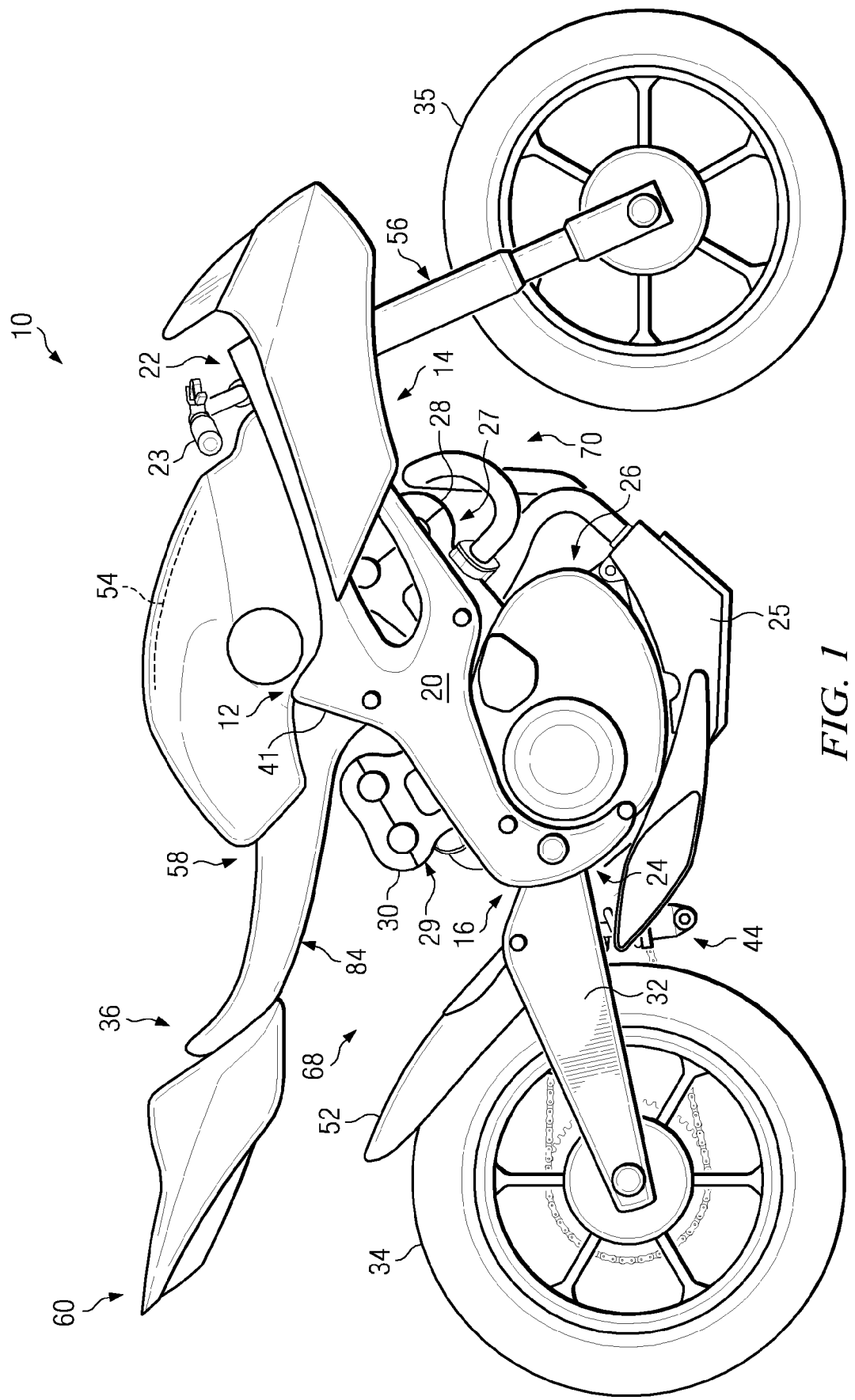
FIG. 1 is a right side elevational view depicting a motorcycle in accordance with one embodiment.
Figure 2:
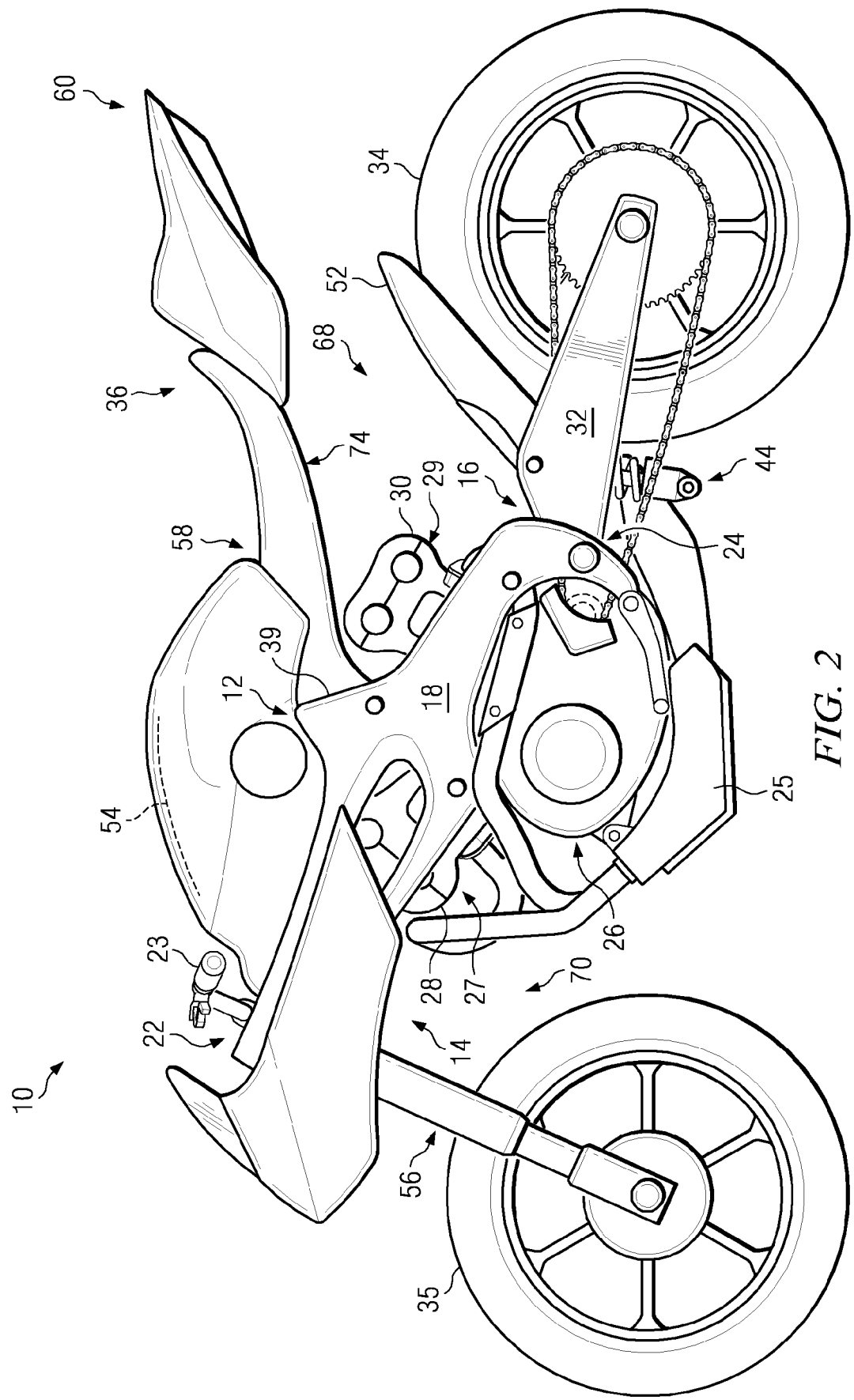
FIG. 2 is left side elevational view depicting the motorcycle of FIG. 1.

Embodiments are hereinafter described in detail in connection with the views of FIGS. 1-2, wherein like numbers indicate the same or corresponding elements throughout the views. A motorcycle in accordance with one embodiment includes components which define an open space adjacent to a cylinder head of the motorcycle's engine. For example, as shown in the example of FIGS. 1-2, a motorcycle 10 is shown to include a main frame 12 extending from a forward end 14 to a rearward end 16. The main frame 12 is shown to include a left main frame member 18 and a right main frame member 20. The left main frame member 18 and the right main frame member 20 are each shown to extend obliquely downwardly and rearwardly from the forward end 14 of the main frame 12 to the rearward end 16 of the main frame 12. The forward end 14 of the main frame 12 can comprise a steering interface 22 and the rearward end 16 of the main frame 12 can comprise a swingarm interface 24.

The left and right main frame members 18 and 20 can be spaced from one another along at least part of their extension. For example, as discussed further below, an engine 26 can be disposed at least partially within a space defined between the left and right main frame members 18 and 20. However, the left and right main frame members 18 and 20 can connect with and/or contact one another at one or more locations, such as near the forward end 14 at the steering interface 22 and/or near the rearward end 16 at the swingarm interface 24. In one particular embodiment, as in the example of FIGS. 1-2, the left and right fork members 18 and 20 can be spaced from each other in a generally corresponding and mirroring relationship with respect to, and on opposite sides of, an imaginary vertical plane which bisects the motorcycle 10 along a longitudinal axis of the motorcycle 10 into left and right sides.

The motorcycle 10 is also shown to include a front fork 56. The front fork 56 is shown to be pivotally attached to the steering interface 22 such that an operator may facilitate steering of the motorcycle 10 through use of a handlebar 23 attached to the front fork 56. A front wheel 35 can be supported with respect to the main frame 12 adjacent to the forward end 14 of the main frame 12 such as by rotatably attaching the front wheel 35 to the front fork 56. The motorcycle 10 is also shown to include a swingarm 32 which is pivotally attached to the swingarm interface 24 of the main frame 12. A rear wheel 34 can be supported with respect to the main frame 12 adjacent to the rearward end 16 of the main frame 12 such as by rotatably attaching the rear wheel 34 to the swingarm 32, as shown in FIGS. 1-2. The swingarm 32 can be configured to support the rear wheel 34 and can be biased with respect to the main frame 12 by a suspension element 44. In one embodiment, as shown in FIGS. 1-2, the suspension element 44 may be attached to the swingarm 32 and to the swingarm interface 24 of the main frame 12. The suspension element 44 can include a shock, strut, spring, and/or other cushioning, dampening, and/or biasing device(s).

The motorcycle 10 is also shown to comprise the engine 26 which is attached to the main frame 12. In one embodiment, as discussed above and shown in FIGS. 1-2, the engine 26 may be attached to the main frame 12 at a location at least partially between the left main frame member 18 and the right main frame member 20. In another embodiment, as also shown in FIGS. 1-2, the engine 26 may be attached to the main frame 12 at a location between the forward end 14 of the main frame 12 and the rearward end 16 of the main frame 12. The left and right main frame members 18 and 20 are shown in FIGS. 1-2 as being attached to the left and right sides of the engine 26 such that the engine 26 hangs downwardly from the main frame 12. As also shown in the embodiment of FIGS. 1-2, the motorcycle 10 can be configured such that no portion of the main frame 12 extends beneath the engine 26 such as to cradle or protect the engine 26. However, in this configuration, a muffler 25 is shown as being attached to the engine 26 at a location beneath the engine 26 and can be configured to protect the bottom of the engine 26 from damage such as from road debris. It will be appreciated that an engine may be attached or otherwise supported with respect to a frame of a motorcycle in any of a variety of alternative configurations.

The engine 26 may comprise an internal combustion engine such as a V-type engine having a first or forward cylinder 27 and a second or rearward cylinder 29 (i.e., a V-twin engine, as shown in FIGS. 1-2). The first cylinder 27 can have a first cylinder head 28 and the second cylinder 29 can have a second cylinder head 30. In one embodiment, as shown in FIGS. 1-2, the first cylinder head 28 may be more closely adjacent than the second cylinder head 30 to the steering interface 22. In another embodiment, as also shown in FIGS. 1-2, the second cylinder head 30 may be more closely adjacent than the first cylinder head 28 to the swingarm interface 24. It will be appreciated that the engine 26 can be configured to consume gasoline, diesel fuel, kerosene, natural gas, propane, alcohol, jet fuel, hydrogen, and/or any of a variety of other fuels.

In one embodiment, as shown in FIGS. 1-2, the main frame 12, the front fork 56, and the front wheel 35 together partially define an open space 70. The engine 26 and/or one or more other components of the motorcycle 10 might also partially define the open space 70. The open space 70 can be of sufficient size to facilitate substantially complete access to the first cylinder head 28 of the engine 26 when the motorcycle 10 is fully assembled (as shown in FIGS. 1-2). It will be appreciated that the open space 70 can be of sufficient size to facilitate servicing of the first cylinder head 28 of the engine 26 when the motorcycle 10 is fully assembled as shown, for example, in FIGS. 1-2. It will also be appreciated that the open space 70 can be of sufficient size to facilitate removal of the first cylinder head 28 when the motorcycle 10 is fully assembled as shown, for example, in FIGS. 1-2. It will be appreciated that this configuration can facilitate the quick and simple removal, replacement, cleaning and/or other servicing of components of the engine 26 such as involving the first cylinder 27. For example, in order to remove, replace, clean and/or otherwise service the first cylinder head 28 of the motorcycle 10, it may not be necessary to first remove, for example, the front wheel 35 and/or the front fork 56 of the motorcycle 10, whereas such steps might be required to perform similar servicing on some conventional motorcycles. It will also be appreciated that the open space 70 can allow for enhanced air cooling of the engine 26 (e.g., the first cylinder head 28) and can contribute to a lighter-weight and less bulky overall visual appearance of the motorcycle 10 as compared with certain conventional motorcycles.

The motorcycle 10 is also shown to comprise a seat 36 which is configured to support an operator during use of the motorcycle 10. In one embodiment, as shown in FIGS. 1-2, the seat 36 can be attached to the left main frame member 18 at a left portion 39 of an attachment location and can be attached to the right main frame member 20 at a right portion 41 of the attachment location. As shown in FIGS. 1-2, the attachment location (e.g., the left and right portions 39 and 41) can be disposed along the main frame 12 about halfway between the forward end 14 of the main frame 12 and the rearward end 16 of the main frame 12. It will be appreciated that a seat may be attached or otherwise supported by or with respect to a main frame in any of a variety of alternative configurations.

In one embodiment, as shown in FIGS. 1-2, the seat 36 extends from a front end 58 to a rear end 60. The front end 58 of the seat 36 is shown to be attached to the main frame 12. In one particular embodiment, as shown in FIGS. 1-2, the front end 58 of the seat 36 can be attached to the main frame 12 at a location about halfway between the forward end 14 of the main frame 12 and the rearward end 16 of the main frame 12. As also shown in FIGS. 1-2, the rear end 60 of the seat 36 can cantilever from the attachment location such that the rear end 60 of the seat 36 overhangs and partially defines an open space 68.

In one embodiment, as shown in FIGS. 1-2, the seat 36 can comprise a lowermost left edge 74 and a lowermost right edge 84. The lowermost left edge 74 is shown to extend generally obliquely upwardly and rearwardly from the left portion 39 of the attachment location. The lowermost right edge 84 is shown to extend generally obliquely upwardly and rearwardly from the right portion 41 of the attachment location.

The motorcycle 10 may also comprise a fuel tank 54, a portion of which is shown in FIGS. 1-2 in dashed lines as being concealed behind other components (e.g., a fuel tank cover body panel) of the motorcycle 10. In one embodiment, as shown in FIGS. 1-2, the fuel tank 54 can be positioned above the engine 26. However, it will be appreciated that the fuel tank may be attached or otherwise supported or positioned with respect to the engine in any of a variety of alternative configurations.

The motorcycle 10 may further comprise a fender 52. In one embodiment, as shown in FIGS. 1-2, the fender 52 can be attached to the swingarm 32 adjacent to the swingarm interface 24. In another embodiment, as also shown in FIGS. 1-2, the fender 52 can extend obliquely upwardly and rearwardly from a location adjacent to the swingarm interface 24 such that the fender 52 extends substantially parallel with respective portions of the lowermost left and right edges 74 and 84 of the seat 36. However, it will be appreciated that the fender may be attached or otherwise supported with respect to a swingarm and/or a swingarm interface of a motorcycle in any of a variety of alternative configurations.

In one embodiment, as shown in FIGS. 1-2, the main frame 12, the swingarm 32, and the seat 36 together at least partially define the open space 68. In another embodiment, as also shown in FIGS. 1-2, the rear wheel 34, the engine 26, and the fender 52 may further define the open space 68. In other embodiments, one or more additional and/or alternative components of a motorcycle 10 may define the open space 68. In one embodiment, as shown in FIGS. 1-2, the entirety of the swingarm 32 and the swingarm interface 24 may be vertically positioned at a location below the second cylinder head 30 of the engine 26. In another embodiment, as also shown in FIGS. 1-2, the entirety of the swingarm 32 and the swingarm interface 24 can be vertically positioned at a location below the attachment locations (e.g., the left portion 39 and the right portion 41) of the seat 36. It will be appreciated that a benefit of such an arrangement is that the open space 68 can be provided as described above.

The open space 68 can be of sufficient size to facilitate substantially complete access to the second cylinder head 30 of the engine 26 when the motorcycle 10 is fully assembled (as shown in FIGS. 1-2). It will be appreciated that the open space 68 can be of sufficient size to facilitate servicing of the second cylinder head 30 of the engine 26 when the motorcycle 10 is fully assembled as shown, for example, in FIGS. 1-2. It will also be appreciated that the open space 68 can be of sufficient size to facilitate removal of the second cylinder head 30 when the motorcycle 10 is fully assembled as shown, for example, in FIGS. 1-2. It will be appreciated that this configuration can facilitate the quick and simple removal, replacement, cleaning and/or other servicing of components of the engine 26 such as involving the second cylinder 29. For example, in order to remove, replace, clean and/or otherwise service the second cylinder head 30 of the motorcycle 10, it may not be necessary to first remove, for example, the swingarm 32, the seat 36, the rear wheel 34, the suspension element 44, the engine 26, and/or the rear fender 52, whereas such steps might be required to perform similar servicing on some conventional motorcycles. It will also be appreciated that the open space 68 can allow for enhanced air cooling of the engine 26 (e.g., the second cylinder head 30) and can contribute to a lighter-weight and less bulky overall visual appearance of the motorcycle 10 as compared with certain conventional motorcycles.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A motorcycle comprising:
   a main frame extending from a forward end to a rearward end and comprising a left main frame member and a right main frame member, wherein the left main frame member and the right main frame member each extend obliquely downwardly and rearwardly from the forward end to the rearward end, and wherein the forward end of the main frame comprises a steering interface and the rearward end of the main frame comprises a swingarm interface;
   an engine attached to the main frame at a location at least partially between the left main frame member and the right main frame member, wherein the engine comprises a first cylinder head and a second cylinder head, the first cylinder head is more closely adjacent than the second cylinder head to the steering interface, and the second cylinder head is more closely adjacent than the first cylinder head to the swingarm interface;
   a swingarm attached to the swingarm interface and supporting a rear wheel; and
   a seat configured to support an operator, wherein the seat is attached to the main frame at an attachment location, and the main frame, the swingarm, and the seat together define at least a portion of an open space, the open space being of sufficient size to facilitate complete access to the second cylinder head when the motorcycle is fully assembled.

2. The motorcycle of claim 1 wherein the open space is of sufficient size to facilitate servicing of the second cylinder head when the motorcycle is fully assembled.

3. The motorcycle of claim 2 wherein the open space is of sufficient size to facilitate removal of the second cylinder head when the motorcycle is fully assembled.

4. The motorcycle of claim 1 wherein the seat is attached to the left main frame member at a left portion of the attachment location, the seat is attached to the right main frame member at a right portion of the attachment location, and the seat extends obliquely upwardly and rearwardly from the attachment location.

5. The motorcycle of claim 4 wherein the attachment location is disposed along the main frame about halfway between the forward end of the main frame and the rearward end of the main frame.

6. The motorcycle of claim 5 wherein the entirety of the swingarm and the swingarm interface are vertically positioned at a location below the attachment location.

7. The motorcycle of claim 1 wherein the entirety of the swingarm and the swingarm interface are vertically positioned at a location below the second cylinder head of the engine.

8. The motorcycle of claim 1 wherein the seat extends from a front end to a rear end, the front end of the seat is attached to the main frame at the attachment location, and the rear end of the seat cantilevers from the attachment location.

9. The motorcycle of claim 8 wherein the seat comprises a lowermost edge extending generally obliquely upwardly and rearwardly from a location adjacent to the attachment location to the rear end of the seat.

10. A motorcycle comprising:
    a main frame extending from a forward end to a rearward end and comprising a left main frame member and a right main frame member, wherein the left main frame member and the right main frame member each extend obliquely downwardly and rearwardly from the forward end to the rearward end, and wherein the forward end of the main frame comprises a steering interface and the rearward end of the main frame comprises a swingarm interface;
    an engine attached to the main frame at a location at least partially between the left main frame member and the right main frame member, wherein the engine comprises a first cylinder head and a second cylinder head, the first cylinder head is more closely adjacent than the second cylinder head to the steering interface, and the second cylinder head is more closely adjacent than the first cylinder head to the swingarm interface;

a swingarm attached to the swingarm interface and supporting a rear wheel;

a seat configured to support an operator, wherein the seat extends from a front end to a rear end, the front end of the seat is attached to the main frame at an attachment location, the rear end of the seat cantilevers from the attachment location, and the seat comprises a lowermost edge extending generally obliquely upwardly and rearwardly from a location adjacent to the attachment location to the rear end of the seat; and a fender attached to the swingarm adjacent to the swingarm interface; wherein:

the main frame, the swingarm, and the seat together at least partially define an open space of sufficient size to facilitate substantially complete access to the second cylinder head when the motorcycle is fully assembled; and the fender extends obliquely upwardly and rearwardly from a location adjacent to the swingarm interface such that the fender extends substantially parallel with a portion of the lowermost edge of the seat and further defines the open space.

11. The motorcycle of claim 1 wherein the engine comprises a V-twin engine.

12. The motorcycle of claim 1 wherein the rear wheel further defines the open space.

13. A motorcycle comprising:

a main frame extending from a forward end to a rearward end and comprising a left main frame member and a right main frame member, wherein the left main frame member and the right main frame member each extend obliquely downwardly and rearwardly from the forward end to the rearward end, and wherein the forward end of the main frame comprises a steering interface and the rearward end of the main frame comprises a swingarm interface;

a V-twin engine attached to the main frame at a location at least partially between the left main frame member and the right main frame member, wherein the engine comprises a first cylinder head and a second cylinder head, the first cylinder head is more closely adjacent than the second cylinder head to the steering interface, and the second cylinder head is more closely adjacent than the first cylinder head to the swingarm interface;

a swingarm attached to the swingarm interface and supporting a rear wheel; and a seat configured to support an operator, wherein the seat is attached to the left main frame member at a left attachment location, the seat is attached to the right main frame member at a right attachment location, the seat extends obliquely upwardly and rearwardly from the left attachment location and the right attachment location, the left attachment location and the right attachment location are disposed along the main frame about halfway between the forward end of the main frame and the rearward end of the main frame, and the main frame, the swingarm, and the seat together define at least a portion of an open space, the open space being of sufficient size to facilitate complete access to the second cylinder head when the motorcycle is fully assembled.

14. The motorcycle of claim 13 wherein the entirety of the swingarm and the swingarm interface are vertically positioned at a location below the second cylinder head of the engine.

15. The motorcycle of claim 13 wherein the seat extends from a front end to a rear end, the front end of the seat is attached to the main frame at the left attachment location and the right attachment location, and the rear end of the seat cantilevers from the left attachment location and the right attachment location.

16. The motorcycle of claim 15 wherein the seat comprises a lowermost left edge and a lowermost right edge, the lowermost left edge extends generally obliquely upwardly and rearwardly from a location adjacent to the left attachment location, and the lowermost right edge extends generally obliquely upwardly and rearwardly from a location adjacent to the right attachment location.

17. The motorcycle of claim 13 wherein the rear wheel further defines the open space.

18. The motorcycle of claim 13 wherein the open space is of sufficient size to facilitate servicing of the second cylinder head when the motorcycle is fully assembled.

19. The motorcycle of claim 18 wherein the open space is of sufficient size to facilitate removal of the second cylinder head when the motorcycle is fully assembled.

20. The motorcycle of claim 1 wherein no portion of the main frame cradles the engine from beneath.

21. The motorcycle of claim 13 wherein no portion of the main frame cradles the engine from beneath.

22. The motorcycle of claim 1 wherein the second cylinder head extends into the open space.

23. The motorcycle of claim 13 wherein the second cylinder head extends into the open space.

* * * * *